Jan. 21, 1969  N. FUSCHILLO ET AL  3,422,636
RADIATION COOLED CRYOSTAT
Filed June 17, 1966  Sheet 1 of 3

INVENTORS
NICHOLAS FUSCHILLO &
CRAMER W. SCHULTZ

BY *Hurwitz & Rose*

ATTORNEYS

EXTREME RAY FROM SOURCE $p = r + l$
$\dot{Q}_W = 1/2\, e_W \alpha\, T^4 (2n p h)$ $\alpha_W = 0.05$ ; $T_{PB} = 153°K$ (10 Watts Internal)
$\epsilon_B = 1.00$ or $T_{PB} = 125°K$ (0 Watt Internal)

INVENTORS
NICHOLAS FUSCHILLO
& CRAMER W. SCHULTZ

BY Hurwitz & Rose

ATTORNEYS ated Jan. 21, 1969

**3,422,636
RADIATION COOLED CRYOSTAT**
Nicholas Fuschillo, Falls Church, Va., and Cramer W. Schultz, Fountain Valley, Calif., assignors to Melpar Inc., Falls Church, Va., a corporation of Delaware
Filed June 17, 1966, Ser. No. 558,487
U.S. Cl. 62—514                    9 Claims
Int. Cl. B64g 1/30

ABSTRACT OF THE DISCLOSURE

A cryogenic system adapted to operate in space in the plane of the ecliptic between the earth and the sun to maintain the local temperature at a low value, by radiative cooling alone, in which the system contains a pillbox configuration for housing an active electronic system, the pillbox surrounded by one or more annular shields and supported wthin the shields by wires or other support members of low thermal conductivity. Each of the shields is of progressively greater diameter and each has a polygonal cross-section in a plane containing the longitudinal axis of symmetry of the overall configuration, the exposed cylindrical wall of the outermost shield characterized by a surface having high reflectivity, and thus low absorptivity, and one or more of the shields having end surfaces, in spaced planes generally perpendicular to the axis of symmetry of the configuration, characterized by a high value of emissivity to provide a high degree of radiation of heat therefrom. The cryogenic system is maintained in orbit with its axis of symmetry oriented perpendicularly to the plare of the ecliptic.

---

The present invention relates generally to thermostatic cooling techniques and more particularly to cryostats which function in space by radiative cooling alone to provide a low temperature environment suitable for the operation of various satellite-mounted electromagnetic radiation detection devices.

It is well known that signal-to-noise ratios for electromagnetic detection devices increase as the temperature of the particular detector is decreased. Also of common knowledge in the art is the fact that many of the most sensitive devices, such as masers, parametric amplifiers, and doped Ge and InSb detectors, to name a few, will function only at temperatures below 100° K., and that some of these extremely sensitive devices require operating temperatures less than 30° K. As a consequence, the use of such devices aboard artificial earth satellites or long-range extraterrestrial vehicles has heretofore been considered impractical owing to the necessity of providing as a part of the payload, the heavy and bulky apparatus long believed essential for achieving cryogenic temperatures. In short, prior art methods of cooling to the required temperatures have relied on the use of active coolants, such as cryogenic coolants (e.g., liquid nitrogen) or have been achieved by resort to massive heat pumps. Beyond the need for greater initial rocket power in order to place a spacecraft so equipped into the desired orbit or extraterrestrial flight path, the use of such special cooling equipment means additional control systems and components which can fail, thus reducing overall system reliability and the probability of success of the mission. Moreover, the cost of active coolant system apparatus for space applications is prohibitive.

Accordingly, it is a primary object of the present invention to provide a completely passive cryostat system for achieving a low temperature environment in spacecraft.

It is a more specific object of the invention to provide a radiation-cooled cryostat which is operable as an artificial earth satellite orbiting in the plane of the ecliptic to provide a cryogenic environment in its inner volume below the critical temperature of several superconducting alloys and to provide temperatures suitable for operation of several sensitive electromagnetic radiation detectors.

Another object of the present invention is to provide cryostats which function in space by radiative cooling alone.

Briefly, in accordance with the present invention the cryostat includes an active volume, such as an instrument package containing the desired electromagnetic detection devices, and one or more solar radiation shields for the active volume, the shield or shields having thermal surfaces constructed to provide portions with low absorptivity (high reflectivity) and other portions with high emissivity, so arranged and disposed relative to the inner volume that when placed in an earth orbit lying in the plane of the ecliptic, the cryostat maintains its inner volume cooled to cryogenic temperatures (e.g., 35° K. or less) solely by radiating heat therefrom, i.e., by a process of radiation cooling alone.

The principal advantages of cryostats constructed in accordance with the present invention include, among others, indefinitely long lifetime, absence of an active cryogenic coolant system or heat pump plant as a part of the payload, provision of sufficiently low temperature environments to permit the use of superconducting devices within the cryostat (primarily within the active inner volume), and capability of utilizing electromagnetic radiation detectors aboard the satellite within an environment conducive to reliable operation.

As will become apparent from the ensuing detailed description of preferred embodiments, the cryostat configuration presents a vehicle capable of supporting auxiliary electronic equipment at temperatures of approximately 300° K. in its outer portion (i.e., the solar radiation shield or shields), as well as providing the desired low temperatures characterizing a cryogenic environment in its inner portion.

While the invention will be described with specific reference to the capability of housing electromagnetic radiation detectors in space, it should be observed that it may also be adapted for other applications, such as an energy storage arrangement for pumping a laser or lasers, a satellite detection system, an infrared surveillance system, or a space vehicle capable of use in conjunction with the conducting of scientific experiments involving earth orbiting criteria or the probing of deep-space.

The above and still further objects, features, and attendant advantages of the present invention will become apparent from a consideration of the following detailed description of certain preferred, but non-limiting, embodiments thereof, especially when taken in conjunction with the accompanying drawings, in which.

Figure 1:
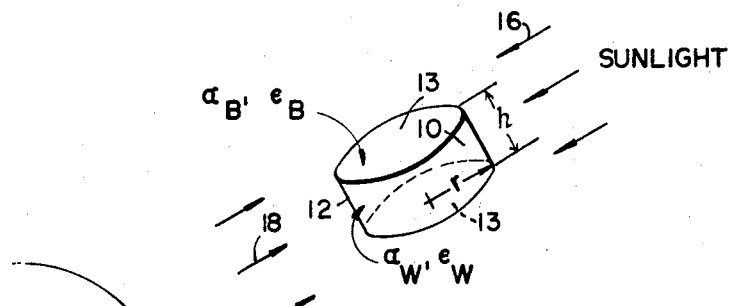
FIGURE 1 is a simplified diagram of a cylindrical cryostat operating in the plane of the ecliptic relative to the sun and earth, useful in explaining the basic concepts of the invention.

Referring now to the drawings, and in particular to FIGURE 1, the cryostat is illustrated as a simple cylinder 10 having an outer cylindrical surface 12, of height $h$ and radius (relative to its axis) $r$, disposed between a pair of planar circular surfaces (bases) 13 of radius $r$. The cryostat is shown as operating in an earth orbit which lies in the plane of the ecliptic, the axis of the cylinder being perpendicular to the plane of the orbit. Hence, sunlight emanating directly from the sun may be viewed as a plane wave having parallel rays 16 which strike the cylinder perpendicularly to cylindrical wall 12 (and the cylinder axis) and parallel to planar walls 13. A similar situation exists for sunlight reflected from the earth, the reflected rays 18 impinging upon the semi-cylindrical surface of the cylinder opposite that upon which the direct rays 16 are incident.

The emissivity ($\epsilon_B$) of upper and lower surfaces 13 is preferably as high as possible (e.g., 0.95 to 1.00) in order that internally generated heat, resulting from power dissipation of system components, may rapidly be radiated from the body of the cylinder. On the other hand, the absorptivity ($\alpha_w$) of the outer cylindrical surface 12 is as low as possible (e.g., 0.02 to 0.05) so that incident sunlight, both direct and reflected, will be substantially totally reflected from that surface. Examples of specific surface construction, materials and coatings suitable for achieving these objectives will be discussed in detail presently.

Solving of the heat balance equations for a cryostat operating in the manner shown in FIGURE 1, that is, equating the heat absorbed by the cryostat plus the heat generated internally to the total heat radiated, provides cryostat temperature for various height-to-radius ($h/r$) ratios of the cylinder 10 at various distances from the earth. The heat balance equation for the simple cylinder 10 in the plane of the ecliptic is $$(\epsilon_w A_w + \epsilon_B A_B)\sigma T^4 = 2rh\alpha_x I_s + 2\pi r^2 K_s \alpha_B I_s + 2\pi r^2 K_E \alpha_B I_E + Q_E \quad (1)$$

where:

$A_w$ is the area of the cylindrical wall;
$A_B$ is the area of the upper and lower bases;
$I_s$ is intensity of radiation from the sun;
$I_E$ is intensity of radiation from the earth;
$K_E$ and $K_s$ represent the ratio of energy falling on a flat plate oriented "edgewise" to the earth and sun, respectively, to the energy falling on the same plate oriented perpendicular to the rays from the source;
$\sigma$ is the Stefan-Boltzmann constant;
$T$ is the temperature of the cryostat;
$Q_E$ is the heat generated by the load internally of the cylindrical volume; and the remaining factors have been previously defined.

Figure 2:
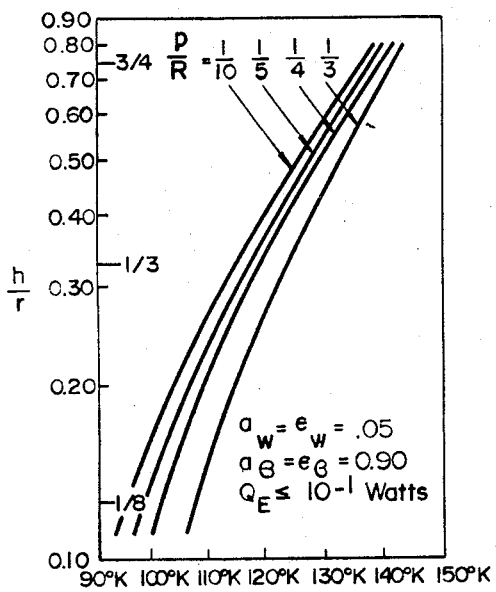
FIGURE 2 is a chart or graph indicative of temperatures achievable with various height-to-radius ratios of the simple cylindrical cryostat of FIGURE 1.

Solutions of heat balance Equation 1 for $T$ using various ratios of $h/r$, and typical values of emissivities ($\epsilon_B$ and $\epsilon_w$) and absorptivities ($\alpha_B$ and $\alpha_w$), and maximum internal heat generation ($Q_E$max.), as indicated in FIGURE 2, show that the temperature of the cryostat decreases with decreasing $h/r$ and increasing distance from the earth (where $\rho$ is the nominal radius of the earth and $R$ is the distance of the cryostat from the center of the earth). The cool down time, i.e., the time required for the cryostat to achieve a given temperature, such as those listed in FIGURE 2, depends primarily upon the size of the cryostat and its specific orbit, but for the sake of example will generally be on the order of a few hours to a few days. This is true for the embodiments to be described as well as the cylindrical configuration of FIGURE 1.

Figure 3:
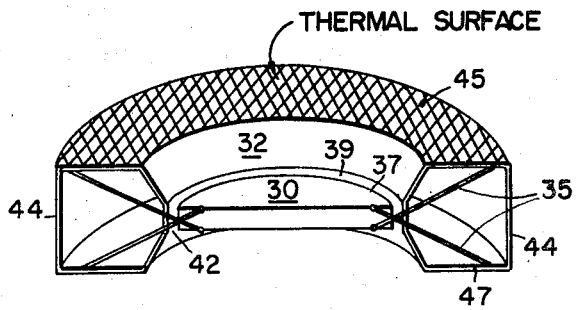
FIGURE 3 is a simplified sectional perspective view of a single-shielded cryostat constructed in accordance with the principles of the present invention.

With reference now to FIGURE 3, the cryostat there shown is of a single-shielded type in which an inner pillbox 30 is encompassed by an outer toroid 32, the latter being adapted to shield the former from radiation from the sun and earth. Inner pillbox 30, which forms the active volume or instrument package, is mounted within toroid 32 by stainless steel wires and/or electrical conductors 35. Adjacent cylindrical surfaces 37 and 39 of the pillbox and toroid, respectively, are separated by an annular gap 42. The toroid absorbs radiation from the sun and earth (i.e., direct and reflected solar radiation, respectively), when placed in orbit in the plane of the ecliptic, along outer cylindrical wall 44 which is composed of a high reflectivity or low absorptivity material, such as polished aluminum or gold plate or foil, for example. The radiation so absorbed is reradiated from top and bottom plates 45 and 47, respectively, which are covered with a thermal surface preferably of the type illustrated in FIGURE 4.

Figure 4:
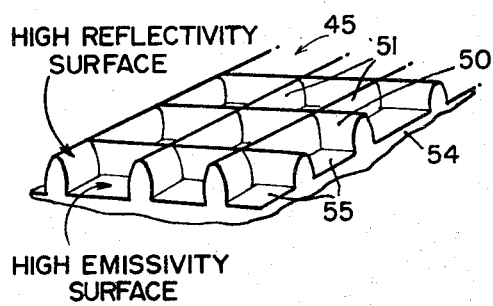
FIGURE 4 is a fragmentary perspective view of the thermal surface covering a portion of the outer surface of the cryostat of FIGURE 3.

Referring concurrently to FIGURE 4, the thermal surface comprises parallel rows 50 and parallel columns 51, the rows and columns being perpendicular to one another, of ridges or raised portions forming a gridwork pattern. The gridwork is supported by a flat plate 54 forming a plurality of bottom surfaces 55 between the ridges. Each of the flat bottom surfaces is provided with a high emissivity coating or layer, such as black matte lacquer, whereas each of the ridges has a low absorptivity (high reflectivity) coating such as that cited as exemplary, above. Hence, solar radiation striking the ridges is reflected from the thermal surface, while the solar radiation absorbed by the cylindrical wall 44 of the toroid is radiated from the flat bottom surfaces 55. As will become apparent from the subsequent description of a design procedure for the single-shielded cryostat, ridges 50 and 51 are constructed in accordance with the desired distance of the cryostat from the earth to completely shade bottom surfaces 55 from rays incident on the thermal surface from both sun and earth. It will be observed that rays striking the ridges at angles of 90 degrees or more are reflected away from the high emissivity surfaces because of the substantially parabolic shape of the ridges. The parameter of interest is the ratio ($\omega$) of surface area available for emission to the total surface area. For the sake of example, a satellite designed to operate at four earth radii would have a thermal surface with 65% of its surface open for emission.

Returning now to the description of FIGURE 3, the heat input to the pillbox from the outer toroid consists of radiation from the low emissivity walls of the toroid and from heat transfer through the support wires and interwall radiation. Since these sources of heat input or heat leakage are relatively small and may be reduced by conventional insulating techniques to substantially negligible values, they are omitted from the design calculations that follow.

Figure 5:
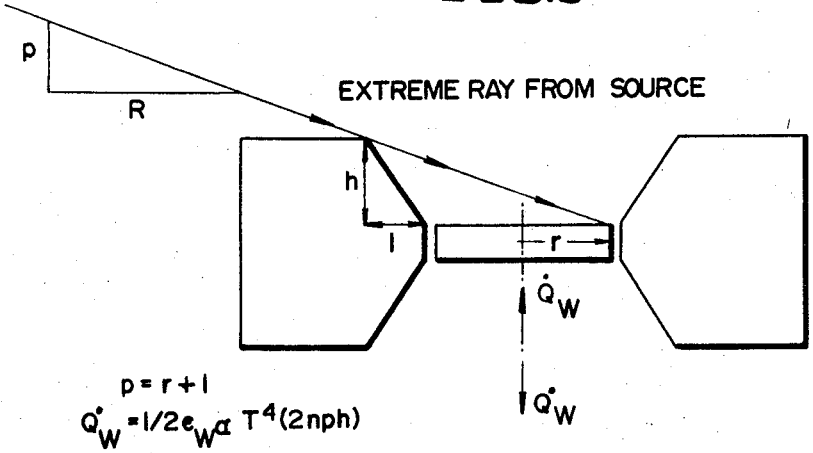
FIGURE 5 is a diagram taken along a plane containing the axis of the configuration of FIGURE 3 and illustrating the manner in which the active inner volume is shaded.
Figure 6:
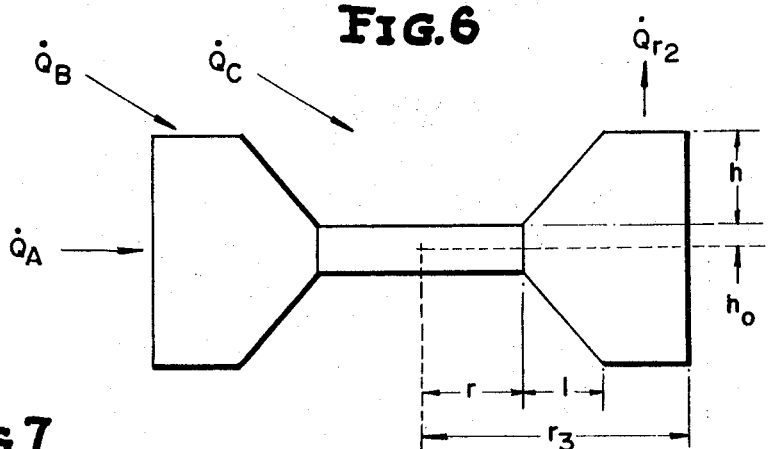
FIGURE 6 is a diagram illustrating the geometry of the shielding portion of the configuration of FIGURE 3.

The procedure for establishing the shading of the inner pillbox by the outer toroid, and for determining the significant dimensions of pillbox and toroid, and temperature of the pillbox, all for various distances from the earth, will now be discussed with concurrent reference to FIGURES 5, 6 and 7. Each of these figures relates to the single-shielded embodiment of FIGURE 3. The valid assumptions are made that the entire projected area of the inner wall (both cylindrical and slanted portions)

of toroid 32 emits radiation which is equally incident on the pillbox and propagated into free space. In addition, the temperature of toroid 32 is assumed to be approximately 300° K. The first basic thermal balance equations to be solved are those for inner pillbox 30, where $$\dot{Q}_{r_1} = \dot{Q}_W + \dot{Q}_E \tag{2}$$

or $$2\pi r^2 \epsilon_B \sigma T_B^4 = 2(\tfrac{1}{2} \alpha_B \epsilon_w T_w^4 2\pi ph) + \dot{Q}_E \tag{3}$$

where $T_w$ is the temperature of the inner wall of the toroid (assumed to be 300° K.);

$\dot{Q}_{r_1}$ is the heat radiated from the pillbox;

$\dot{Q}_W$ and $Q_E$ are respectively the heat input to the pillbox from radiation emitted from the inner wall of toroid 32 (equal, as previously stated, to the heat radiated into the free space by that wall), and the heat generated internally of the pillbox by the electronic equipment contained therein;

$p$, $r$ and $h$ are defined in FIGURE 5;

$T_B$ is the temperature of the pillbox; and the remaining parameters have previously been defined;

and the overall balance equation for the cryostat, where $$\dot{Q}_{r_2} = \dot{Q}_A + \dot{Q}_B + \dot{Q}_C \tag{4}$$

as illustrated in FIGURE 6, where $\dot{Q}_{r_2}$ is the radiation emitted from the thermal surface of the toroid;

$\dot{Q}_A$ is the radiation incident on the outer wall of the toroid;

$Q_B$ is the flux falling on the thermal surface of the toroid; and $Q_C$ is the flux impinging on the highly reflective inner wall of the toroid.

Hence, Equation 4 may be written $$2\epsilon_B \omega \sigma T^4 \pi [r_3^2 - (r+1)^2] = (I_s + I_E) \alpha_w \cdot 2r_3 \cdot 2(h+h)$$
$$+ 2\pi [r_3^2 - (r+1)^2] \alpha_w (K_s I_s + K_E I_E)$$
$$+ 2\pi (r+1)^2 \alpha_w (K_s I_s + K_E I_E) \tag{5}$$

where $r$, $l$, $h$, $h_o$, and $r_3$ are defined in FIGURE 6; and the remaining parameters have previously been defined.

Combining terms, Equation 5 becomes $$r_3^2 \left[ \sigma T^4 - \frac{\alpha_w}{\epsilon_B \omega} (K_s I_s + K_E I_E) \right]$$
$$- r_3 \frac{2\alpha_w (h+h_o)(I_s I_E)}{\epsilon_B \omega \pi} - \sigma T^4 (r+1)^2 = 0 \tag{6}$$

The term $$\frac{\sigma w}{\epsilon_B \omega} < 1$$

for typical values and the term $(K_s I_s + K_E I_E) \approx 0.3 \times 10^{-3}$ watts/cm.², when $\rho/R = \tfrac{1}{3}$ and is less for smaller values of $\rho/R$. On the other hand, $\sigma T^4$ is at least an order of magnitude greater than the last-mentioned term of Equation 6 for $T > 150°$ K. Therefore, the term $$\frac{\alpha w}{\epsilon_B \omega} (K_s I_s + K_E I_E)$$

may be neglected in the further calculations.

Figure 7:
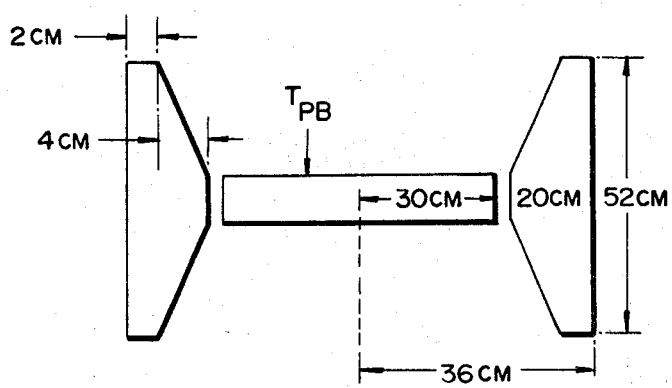
FIGURE 7 is a diagram illustrating the design parameters for the configuration of FIGURE 3 utilizing typical values for factors in the pertinent thermal balance equations.

The design parameters obtained from a solution of the above heat balance equations for the embodiment of FIGURE 3, given certain predetermined criteria such as orbit distance from the earth and power dissipated in the pillbox, are shown in FIGURE 7. The satellite is designed to orbit at a distance of four earth-radii from the center of the earth (i.e., $\rho/R = \tfrac{1}{4}$), where 10 watts of electrical power are to be dissipated in the pillbox, and as indicated in the figure, the pillbox temperature is 153° K. (or 125° K. for zero watt generated internally).

The same procedure is followed in the design of more complex cryostat configurations, such as a multi-shielded satellite. For the sake of example, the design of a satellite which is capable of achieving temperatures of 10° K. or less in its innermost portion by radiation alone, will now be considered. A half section of a multi-shielded satellite having such a capability is shown in schematic diagrammatic form in FIGURE 8. It will be apparent that in order to achieve the specified temperatures, the electrical power dissipated at these temperatures must be held to a minimal value. More particularly, a heat load on the order of $10^{-5}$ watt can be tolerated.

Figure 8:
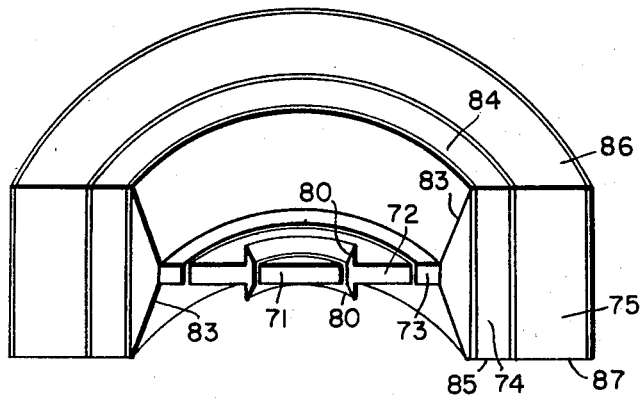
FIGURE 8 is a partial perspective view of a multi-shielded cryostat embodiment of the invention.

The satellite depicted in FIGURE 8 consists of five concentric rings, designated respectively from innermost to outermost ring by reference numerals 71–75. Innermost ring 71 is of simple pillbox shape and is to be the coldest portion of the satellite. Ring 72 has along its inner edge, i.e., the edge adjacent pillbox 71, sloping wall portions 80 which are to shield the pillbox from the larger "shadow" wall portions 83 of ring 73. The purpose of shadow wall 83 is to prevent entry into the inner portions of the satellite of direct solar radiation (sunshine) or earth-reflected solar radiation (earthshine). The two outer rings, 74 and 75, are designed to radiate most of the heat input introduced by the radiation received from earth and sun on the outer surfaces of the configuration. To this end, one or both of the rings 74 and 75 has its top and bottom surfaces 84, 85 and/or 86, 87, respectively, covered with the thermal surface described earlier herein. If only one of these rings is so covered, it is preferred that it be ring 74. Also as previously described, the several rings are mounted one inside the other by support wires, e.g., of stainless steel.

Figure 9:
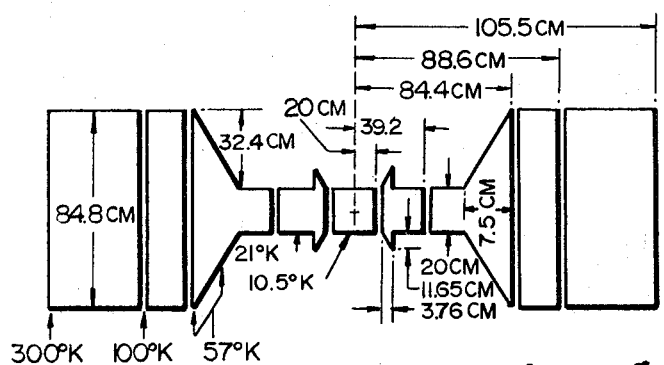
FIGURE 9 is a diagram illustrating design parameters for the configuration of FIGURE 8.

Calculations are carried out by resort to the heat balance equations in the manner discussed in conjunction with the description of FIGURES 3–7, and the resultant exemplary design parameters for a satellite orbiting the earth at 5 earth-radii, with $2 \times 10^{-5}$ watt of electrical power dissipated in the innermost ring are shown in FIGURE 9. It will be observed that the pillbox radius is 20 centimeters and the height 20 centimeters, with $\alpha_w = 0.05$ and $\alpha_B = \epsilon_B = 1$.

Figure 10:
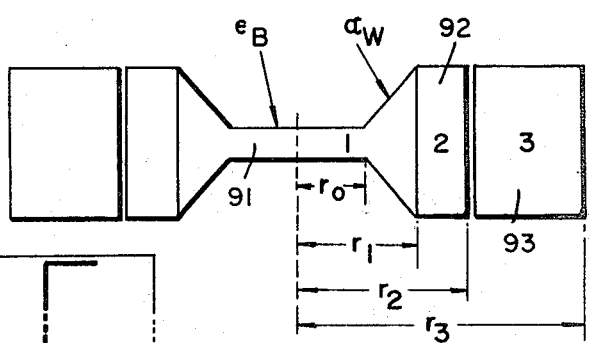
FIGURE 10 is a temperature profile chart for the cryostat of FIGURE 8.

The resulting temperatures calculated, after assuming $T_5 = 300°$ K. and $T_4 = 100°$ K., are $T_3 = 57°$ K., $T_2 = 21°$ K., and $T_1 = 10.5°$ K. This temperature profile is shown in FIGURE 10, where the temperature is plotted as a function of distance from the center of pillbox 71. Accordingly, the multi-shielded satellite configuration of FIGURES 8 and 9 provides superconducting temperatures for the various applications mentioned earlier herein, including suitable temperatures for operation of sensitive infrared detectors such as Au-doped Ge. Moreover, the space between the two outer rings 74 and 75 may be utilized for packaging of batteries and supporting electronic equipment, the temperature of this zone being suitable for such purposes. Solar cells may also be mounted at various locations on surfaces of the satellite exposed to solar radiation, either direct or reflected, to provide the system with auxiliary power.

Figure 11:
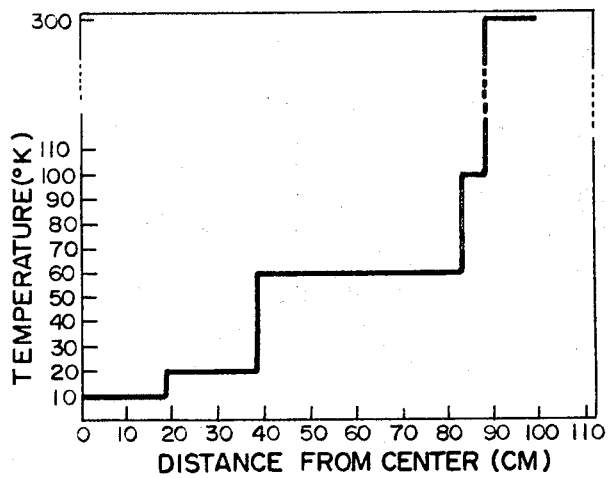
FIGURE 11 is a schematic diagram of a further multi-shielded cryostat embodiment of the invention.

As a final specific, but exemplary, application, the cooling of an infrared detector by a simplified 3-ring cryostat, shown in schematic diagrammatic form, FIGURE 11, is considered. As before, the rings 91, 92 and 93 are mounted one inside the other by support wires, and the heat conduction resulting from these wires is neglected in the calculations. Proceeding with a formulation of the design parameters in the earlier-described manner, if the temperature of outer ring 93 is 300° K., and that of middle ring 92 is 100° K., the temperature of inner section or portion 91 may readily be calculated. For an inner pillbox radius $r$ of 20 cm. $\alpha_w = 0.05$, $\epsilon_B = 0.90$, $\dot{Q}_E = 10^{-3}$ watt, and a cryostat orbit at 10 earth-radii from the center of the earth, the inner pillbox temperature will reach approximately 35° K.

Each of the rings, including the inner pillbox, of each of the above-described exemplary embodiments is hollow, and may, in the case of the shielding rings, be packed with super-insulating material of any of the types well known in the art, or, in the case of the pillbox and adjacent rings, have the desired electronic and solid state instrumentation packaged therein. One example of super-insulating material is multiple layers of aluminum foil separated by fiberglass or rock wool, manufactured by Linde.

While we have disclosed certain exemplary embodiments of our invention, it will be apparent that variations in the specific details of construction which have been illustrated and described may readily be resorted to by the practice of ordinary skill in the art without departing from the spirit and scope of the invention. In this respect it is to be observed that the very methods of construction are based on a specific low temperature requirement. Accordingly, it is desired that our invention be limited only by the appended claims.

We claim:

1. A radiation cooled cryostat adapted to function in space in an earth orbit in the plane of the ecliptic with its longitudinal axis perpendicular to said plane to provide cryogenic temperature environment for electronic equipment or instrumentation packaged therein, said cryostat comprising a closed hollow cylinder, a plurality of hollow rings concentric with each other, and with said cylinder and progressively encompassing the cylindrical surfaces of said cylinder and each successive ring, support wires mounting said rings one inside the other and mounting said cylinder with its axis coincident with said axis of said cryostat, each of said rings having a polygonal cross-section in planes containing said axis with substantially parallel walls in planes perpendicular to said axis, at least the outermost ring having an exterior cylindrical wall with a solar radiation absorptivity value on the order of $10^{-1}$, and at least one of said rings having its said parallel walls covered with a thermal surface configuration for maximum emission of heat therefrom.

2. The invention according to claim 1 wherein said thermal surface configuration comprises a gridwork of ridges on a substantially planar surface, said ridges having surface areas composed of highly reflective material and the exposed portions of said planar surface between said ridges composed of a material characterized by an emissivity value exceeding 0.9.

3. A cryogenic system for operation in outer space to maintain local temperature in a range below approximately 300° K. by radiative cooling alone, said system comprising a structural configuration to be exposed to radiant energy from at least one source thereof tending to transfer heat to said configuration, said configuration having an axis of symmetry and a continuous closed surface portion encircling said axis of symmetry to be oriented nominally perpendicular to rays emanating from said source, said configuration having a further continuously closed surface portion to be oriented nominally parallel to said rays, the first-named surface portion having a low heat absorptivity value for high reflectivity of said rays, said further surface portion having a high emissivity value for rapid radiation of heat therefrom from a region internal to said configuration to a region external to said configuration, said absorptivity value being less than 0.1 and said emissivity value being greater than 0.9.

4. The cryogenic system according to claim 3 wherein said configuration includes an enclosed active volume, and at least one shield encompassing said enclosed active volume for preventing the incidence of said rays thereon, and means coupling said shield to said enclosed active volume for support thereof, said coupling means having negligible thermal conductivity characteristics.

5. The cryogenic system according to claim 4 wherein said shield includes said first-named surface portion and said further surface portion, said first-named surface portion composed of highly polished metal, said further surface portion being partly reflective and partly emissive, and wherein said active volume is enclosed within a closed container, each of said container and said shield being hollow and having polygonal cross-sections in planes containing said axis.

6. The cryogenic system according to claim 5 wherein said further surface portion comprises a reflective region in the form of ridges extending along a substantially planar wall in a gridwork pattern, and an emissive region including the surface of said planar wall exposed between the ridges in said gridwork pattern.

7. The cryogenic system according to claim 6 wherein said container comprises a closed cylinder for housing heat dissipating instrumentation, and wherein said shield is an annulus having said polygonal cross-section and having an inner cylindrical wall encircling the cylindrical wall of said container, said shield having a thickness greater than that of said cylinder and the inner wall thereof having a tapered portion in regions extending beyond the cylindrical wall of said container.

8. The cryogenic system according to claim 7 wherein said first-named surface portion and said reflective region of said further surface portion are composed of polished aluminum, said emissive region of said further surface portion is composed of black matte lacquer, and said coupling means comprise stainless steel wires supporting said container within the annular shield.

9. The cryogenic system according to claim 7 wherein is provided a plurality of annular shields, having progressively larger diameters to encompass the outer cylindrical wall of the next smaller shield, the smallest shield disposed adjacent and encompassing said cylindrical wall of said container.

References Cited

UNITED STATES PATENTS

| | | | |
|---|---|---|---|
| 2,913,609 | 11/1959 | Lennard | 62—514 |
| 2,973,434 | 2/1961 | Roberts | 62—514 |
| 3,315,478 | 4/1967 | Walsh et al. | 62—45 |

ROBERT A. O'LEARY, Primary Examiner.

U.S. Cl. X.R.

62—260, 239